J. W. KILCREASE
S. A. THOMAS, JR.
D. D. WHITLOW
INVENTORS

BY
Ely Silverman
ATTORNEY

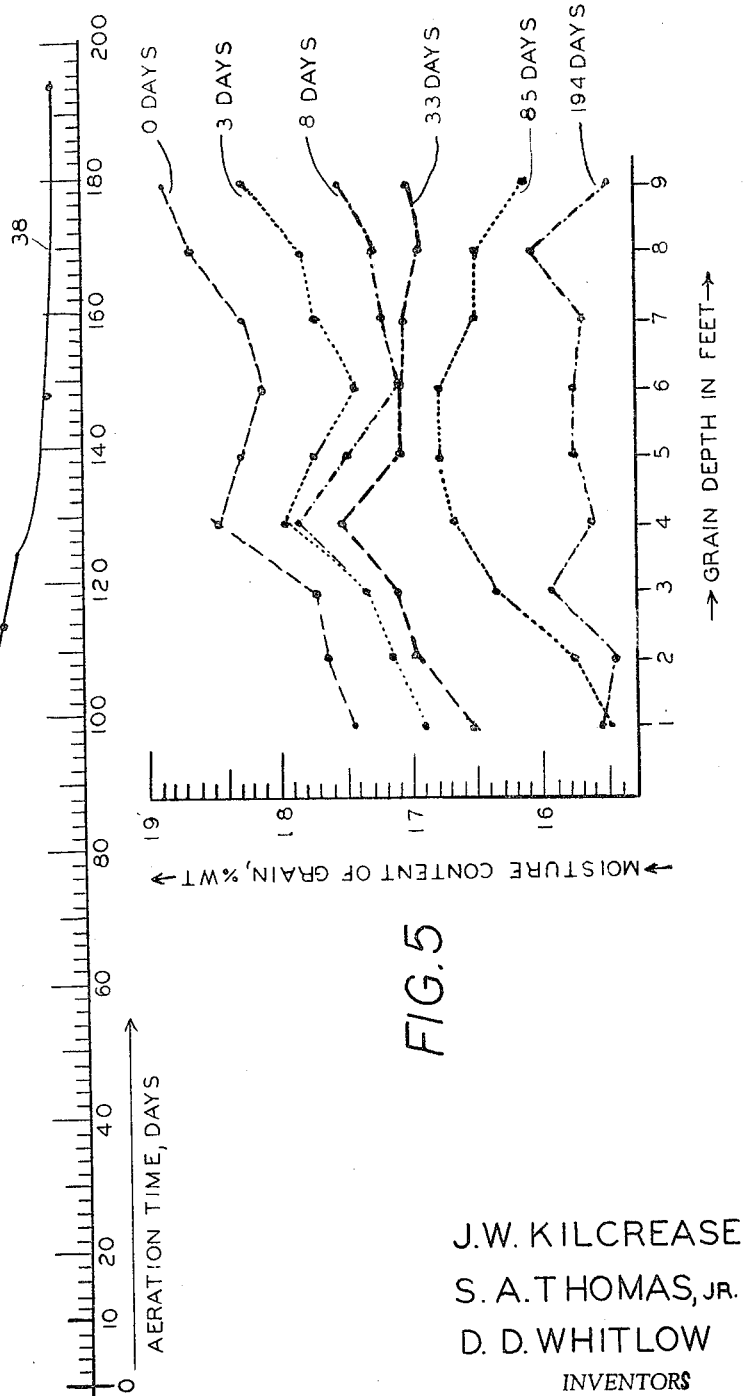
FIG. 4
FIG. 5
J. W. KILCREASE
S. A. THOMAS, JR.
D. D. WHITLOW
INVENTORS
BY
*Ely Silverman*
ATTORNEY Aug. 2, 1966 J. W. KILCREASE ET AL 3,264,118
PROCESS FOR THE TREATMENT AND PRESERVATION OF
GRAIN QUALITY DURING STORAGE
Filed Dec. 17, 1962 4 Sheets-Sheet 4

INVENTORS
J.W.KILCREASE
S.A.THOMAS, JR.
D.D.WHITLOW

BY
*Ely Silverman*
ATTORNEY 3,264,118
PROCESS FOR THE TREATMENT AND PRESERVATION OF GRAIN QUALITY DURING STORAGE
Jack W. Kilcrease, 1621 Lipscomb St., and Samuel A. Thomas, Jr., 1504 Bowie St., both of Amarillo, Tex., and Dooley Doone Whitlow, P.O. Box 398, Happy, Tex.
Filed Dec. 17, 1962, Ser. No. 245,016
7 Claims. (Cl. 99—153)

This invention relates to a process of storing grain. More particularly, this invention is directed to the preservation of grain quality during storage, said grain having a high moisture content, as well as reducing insect and mold damage during such storage.

It has been observed that, in unheated air drying applications in south Texas, the moisture in the wettest layer of grain must be reduced to 15 percent in eight days or less to prevent undesirable mold development. Also, to avoid possible damage due to insect infestation, frequent inspection and fumigation of stored grain are usually required. However, the use of bromide and cyanide fumigant has created residue hazard in grain which is held in storage for long periods (Pest Control magazine, July 1961 "Fumigation Hazards as Related to the Physical, Chemical and Biological Properties of Fumigants" by W. Keith Whitney). When natural air is used for aeration, the moisture content of the stored grain is often reduced below the desired level during the storage period because of the drying which occurs when grain is cooled with such air.

The aeration of grain with conditioned air as herein described offers a solution to insect control problems and the elimination of possible residue hazards. According to the process herein described, grain moisture content substantially in excess of 15 percent may be obtained after storage for long periods, i.e., over 180 days, without any undesirable mold development or residue hazard.

One object of this invention is to provide an economic and reliable process for long-term storage for varied species of foods, especially cereals and grains.

Another object of this invention is to provide a process and reliable apparatus for the economical storage of grains, and especially of grains of relatively high specific surface, i.e., of the order of 100 to 800 sq. ft. of surface area of seed per bushel—and including grains and seeds having bulk densities of from about 20 to about 50 pounds per cubic feet—with minimum effect from insect infestation and mold growth and residue hazards.

Yet another object of this invention is the production of a treated seed having particularly good storage qualities, being resistant to water loss and insect and mold infestation for long periods of time.

Other objects of this invention will become clear to those skilled in the art on study of the description set forth in the below specification of which specification the drawings attached hereto form a part and in which drawings the same numbers refer to the same parts through all said drawings and in which drawings:

FIGURE 4 is a graph which shows the relationship of the aeration time and moisture content of the grain treated according to the process of this invention;

FIGURE 5 is a graph which illustrates the moisture content of the grain measured at different days in the apparatus of FIGURE 1 operated according to the process of this invention;

Figure 1:
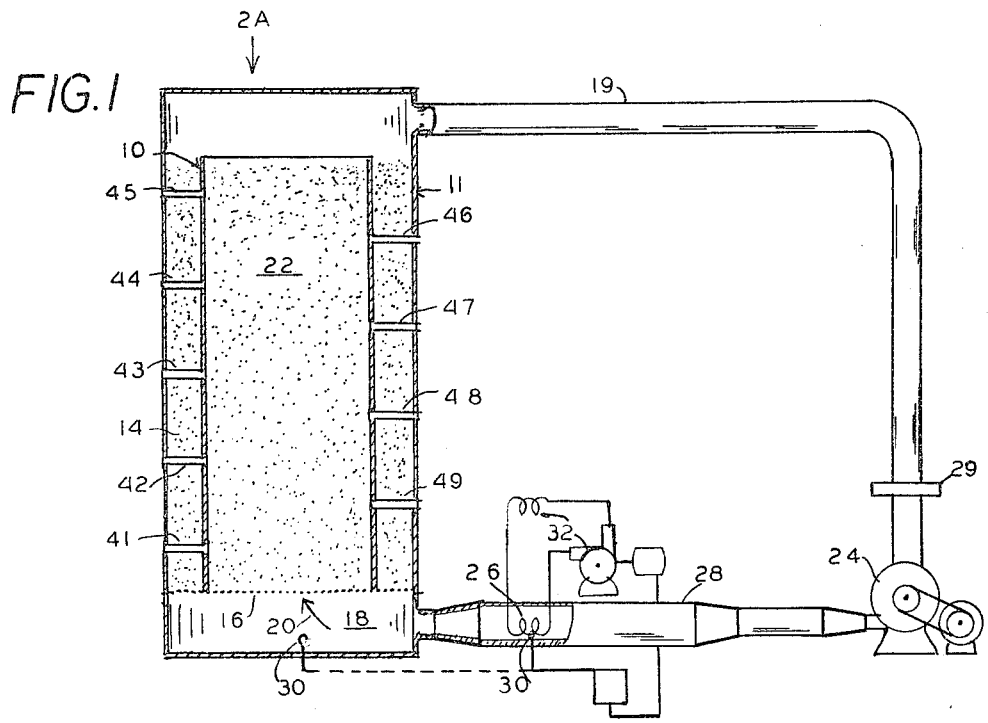
FIGURE 1 is a vertical cross-sectional view of apparatus for carrying out the process of this invention, said apparatus being viewed along the section 1A–1B of FIGURE 2.
Figure 2:
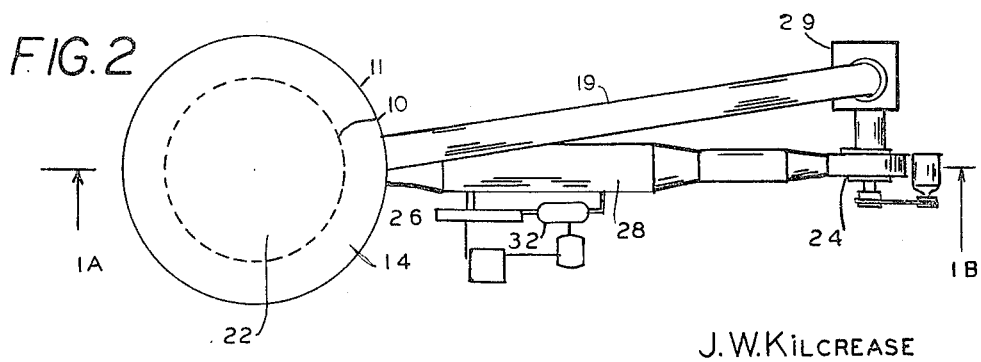
FIGURE 2 is a top view along the arrow 2A shown in FIGURE 1.

Generally, this invention comprises a process of economically and effectively storing grain having an initial high moisture content for long periods of time. Although this invention is primarily directed to the storage of cereal grains, as below described, this method may also be applied to various species of fruit and vegetables.

According to this invention, there is provided a process of storing cereal grains with initial moisture content of 14 to 20% by weight for periods of 190 days and over, said grain having a surface area of 200 to 800 square feet per bushel. This is done by circulating conditioned air through said grain in a closed container, said air having less than 70 percentum relative humidity and temperatures that vary between 33° to 70° F. This air is preferably circulated at the rate of $7 \times 10^{-5}$ to $20 \times 10^{-5}$ cubic feet per minute per square foot of surface area of the grain, followed by cooling and dehumidifying the gas. The air is cooled and dehumidified to maintain less than 70 percent relative humidity in the interseed air and thereby maintain the grain temperature at every point in said mass preferably below about 50° F. for the major portion of said period with said mass being brought to below such 50° temperature within about four days. In a preferred embodiment of this process the temperature of all the seed in the mass is brought to below 50° F. in an initial period of from 24 to 180 hours. The input air has a temperature ranging from 30° F. to 70° F. and, respectively, relative humidities of 100 percent to 60 percent. The exhaust temperature of the gas used may have a temperature of 40° to 100° F. with 95 percent to 75 percent relative humidity.

The apparatus used in the process of this invention generally comprises a gas-tight, dry, clean, insect-free, weather-proof container connected to a refrigerating coil and a compressor, a motor for the compressor, ducts from the coil connecting into the container and conduits therefrom to the coil and for circulating air relatively evenly throughout the container or bin either from one side of the bin to the other or from the bottom to the top. Means are provided for flowing the air through said conduits at a rate from one-half (0.5) to one-twentieth (0.05) cubic feet per minute per bushel.

The invention also comprises the product of this process. This product comprises grains of cereal such as milo grain sorghum at a temperature of about 45°–55° F. having a moisture content of 14 to 20 percent, substantially free of storage mold and having the same set of sedimentation qualities as said grain has prior to storage and wherein said grain has a surface of from 200 to 800 square feet per bushel and the micropyle area thereof has been rendered substantially impervious to the passage of moisture therethrough.

By "substantially impervious" is meant that the rate of moisture loss from grain in contact with input air at 33° F. at 100 percent relative humidity and exhaust air at 70° F. and having a relative humidity of 60 percent, is less than one percent, in 100 days, and the air flow distribution is about $7 \times 10^{-5}$ cubic feet per minute per square foot of surface area of said grain.

While we do not desire to be limited to the theory herein expounded, the application of such theory is a part of this invention and included therein. Generally, we have discovered a method of treatment of cereal grains of high specific surface such as milo, wheat and corn, which have a nut-like seed structure comprising a testa or seed coat, an internal endosperm and embryo, and the seed coat having a micropyle. The outer covering or bran layers of such grains are high in protein ($\approx$6–7%), oil ($\approx$5%), cellulose and hemicellulose, and mineral constituents ($\approx$2%), while the endosperm consists largely of starch granules ($\approx$80–85%) imbedded in a matrix of protein (10–15%) and little oil (<1%). The germ is rich in proteins ($\approx$15–20%), lipid ($\approx$25%), sugar, and ash ($\approx$10%). The bulk of the seed is taken up by the flour portion or endosperm. The endosperm has a rather low content of oil ($\approx$0.5%), while the bran not only has a high oil content but also, in the case of sorghum grains, has a substantial portion (<0.25%) of wax such as carnauba wax. The moisture content of the grain is contained substantially entirely within the kernal of the grain and is not on the surface thereof. Accordingly, such moisture as is reasonably readily removed from the grain at temperatures below 110° F. comes through the micropyle area. By causing a rapid flow and loss of moisture through the micropyle zone under such conditions as will provide for extremely rapid cooling thereof—although for only a short time—the constituents of the surface zone of the micropyle zone are substantially irreversibly gelled and form a plug relatively impervious to further passage of moisture. Accordingly, this invention is directed to the treatment of food products, more especially to the cereal grains, the seeds or fruit of which have a substantially water-impervious and high ($\approx$5%) oil content shell and wherein said shell has a distinct micropyle.

According to this invention, as a first step or stage, a sufficiently rapid rate of water removal is obtained from the micropyle zone 91 of the seed 92 for a sufficiently long period of time to affect a gelation of the colloid constituents at and near the surface 93 thereof. This gelation is achieved by an evaporative cooling of the constituents thereof. The water for this cooling comes from the high moisture mass 94 contained within the substantially water-imperivous shell or testa, 95. The evaporative cooling is thus effected substantially entirely all at one small (the micropyle) portion of the total surface of the seed and causes a rather definite drop in temperature at such limited zone and area, and such cooling causes gelation of the mass at and near the micropyle zone surface. Thereby the constituents at and near the surface of said micropyle zone becomes substantially impervious to passage of moisture. This first step of cooling, which lasts for only relatively few hours, thus seals the seed against continued substantial moisture loss and also provides a barrier through which insects and molds do not penetrate. However, after treatment and development of such a gelled water-barrier structure in the micropyle zone of each of the seeds, the evaporation and cooling thereof may be substantially less intense. In the preferred embodiment, the formation of such barrier is generally indicated by a substantial decrease in rate of water removed from the grain mass although the rate of flow and temperature and relative humidity of the treating air remains substantially constant (note change of slope of line 90 of FIGURE 4 at about 12 days). Thereafter, as the remainder of the surface area of the grain is relatively impervious to moisture, such continued relatively cool air blowing past such other portions does not remove moisture from the grain. With the micropyle zone thus physiologically and/or functionally "plugged," the remainder of the grain treatment of this invention, below described as the second stage, is devoted to maintaining the temperature of the grain below such temperatures at which the mold might grow in the stored grain. These second stage temperatures, it will be noted, may be chosen relatively independent of the moisture content of the grain at that time, because of this "plugging" of the micropyle area.

In order to obtain products of particularly high grain moisture content, parameters have been developed for use of the temperature and humidity of the gasses passing said grain in the second stage when the grain moisture percent is to be any particular desired range. Further still, according to this invention, the grain may be pretreated by a vapor to intentionally raise the initial moisture content of the grain to provide that the subsequent removal of moisture from that grain in order to accomplish the above-described cooling and plugging effect in the micropyle area will still leave the thus impregnated grain with a final moisture content as desired. Further still, during this pre-treatment or impregnation period, other gases or vaporizable constituents may be incorporated within the kernel of the grain.

In the preferred embodiment of this invention below described there is a rate of removal of water of about, initially, 3½ g.p.h. and between three to four gallons an hour per thousand bushels of milo grain having an initial water content of about 18% (by weight). This rate of water removal tapers down to provide a rate of water removal of 60 gallons over a period of two days per thousand bushels of such grain.

As a second step or stage the grain is kept in contact with air or other gas non-toxic to humans at a controlled temperature and relative humidity in equilibrium with the grain moisture content which is finally desired. This second stage treatment is substantially less intense than the treatment during the first stages. This less intense treatment results in that the amount of moisture taken from the grain is considerably reduced in such second stage of treatment. The first stage treatment is adequate to bring the surface temperature of the micropyle zone material of the seed down to a temperature at which it gels and/or is below about 55°. The subsequent second stage treatment keeps that zone at substantially the same temperature with only such water removal as is desired. Interestingly enough, the invention herein comprises the discovery of and the process steps involved in taking advantage of the discovery that (as when the apparent grain mass temperature may rise as below discussed in relation to data of FIGURE 3) the temperature at the zone of the micropyle is not always truly represented by the temperature of the grain as a whole. This is for the reason that the micropyle area is relatively small, and that the surface of the grain is large, compared thereto. Accordingly, low relative humidity air coming past such grain will have its temperature raised by the warm grain. However, the temperature of the micropyle area of the grain will depend not only on the temperature of the whole grain but also on the relative humidity content of the gas or air flowing therepast. The higher temperature grain, which is in direct heat exchange with the low relative humidity air, raises the temperature of the air and so increases the effectiveness of the moisture removal from the micropyle zone of said grain or adjacent grains—and vice versa—which thereby more effectively chills the micropyle area and prevents, by this rather drastic action in the early or first stages of this process of grain treatment, a further removal of large amounts of moisture from the grain even though at relatively elevated temperatures.

In one example of the process according to this invention, the equipment used and shown in FIGURE 1 includes a small scale sheet metal bin, 10, four feet in diameter and ten feet high. The sheets are smooth and made tight against insects, water and weather by caulking. The bin has a capacity of approximately 100 bushels. As shown in FIGURE 1, a second sheet metal bin, 11, six feet in diameter, surrounds the first bin and is structurally the same in regard to tightness against insects, water and weather, providing a twelve inch layer of grain, 14, which acts as an insulator and reduces the heat flow into the first bin. The walls of the outer bin are insulated. Both bins are installed on a perforated floor, 16, attached to a plenum chamber, 18, six feet in diameter and 18 inches high. The perforations are sufficiently small to prevent passage of the grain therethrough and are evenly spaced to provide for even gas flow therethrough.

The tops of the bins are sealed and 8 inch diameter air ducts are installed to provide a closed system for circulating refrigerated air through the grain 22 in both bins. The air passes from a 5 H.P. pump, 24, past a chilled water coil, 26, in a cooling chamber, 28, and into the plenum chamber, 18. The humidity of the air, 20, entering the grain, 22, is controlled by coil temperature with the sensing element, 30, actuated by the coil temperature and actuating the compressor pump, 32, to provide for chilling the coil, 26, to a predetermined value of coil temperature, 33° F. in the particular embodiment below described. The humidity of the air entering the plenum chamber is thus controlled by the coil temperature to approximate, usually, that water content corresponding to 33° F. and 100 percent relative humidity or, at 50° F., about 40 percent relative humidity.

Sampling ports 41–49 were installed in the bin wall at each foot level to allow grain samples to be taken from the test bin. A dust filter, 29, is provided in the 8-inch diameter duct 19.

The bins, 10 and 11, were filled to a depth of 10 feet with No. 1 yellow milo grain sorghum having an average moisture content of 18.19 percent and, as in the field, a temperature of 95° F. The grain had an average surface area of $3.40 \times 10^{-4}$ square foot per seed and a surface area of $3.38 \times 10^{+2}$ square feet per bushel. The grain had a net weight of 56 pounds per bushel and a bulk density of 44.8 pounds per cubic foot.

Generally, air, cooled between 33° and 70° F.—an average of 45° F. and 50 percent relative humidity—before it entered the grain was recirculated through the bin at an average rate of 0.12 cubic feet per minute per bushel. The amount actually varied from 0.5 (at the beginning of the process) to .05 cubic feet per minute per bushel, as below described. Continuous circulation was maintained for 1077.5 hours, i.e., approximately 45 days. At this time, equipment was installed to automatically cycle the cooling air when demanded by rise of air temperature in the bin plenum over 40° F. Intermediate aeration with conditioned air was thereafter continued for 78 days. After the period of intermittent aeration, conditioned air was again circulated through the test bin continuously until the conclusion of the test after a period of 194 days. The air flow varied from $5 \times 10^{-2}$ cubic feet per minute per bushel or there was an air flow distribution of $1.48 \times 10^{-4}$ to $1.48 \times 10^{-3}$ cubic feet per minute per square foot of grain surface area.

At regular intervals grain samples were tested to determine mold growth and germination and with results as shown in Tables 1 and 2, respectively.

A 24 point recording potentiometer was used to obtain temperature measurements of air entering the grain and at each foot level in the grain through sampling ports 41, 42, 43, 44, 45, 46, 47, 48 and 49. A record of temperatures at those points in the test bin and the circulating system were also obtained and are summarized in FIGURE 3.

A hygrometer was used to determine the relative humidity of the air entering and leaving the grain. This data is summarized in Table 3. The data was further plotted against the percent of moisture in the grain for the relative humidity and temperature of the air blowing therepast at the air flow distribution provided herein to determine the temperature and humidity relations of air in equilibrium with grain at several different degrees of moisture of the grain and such parameters are summarized in Table 4.

Figure 3:
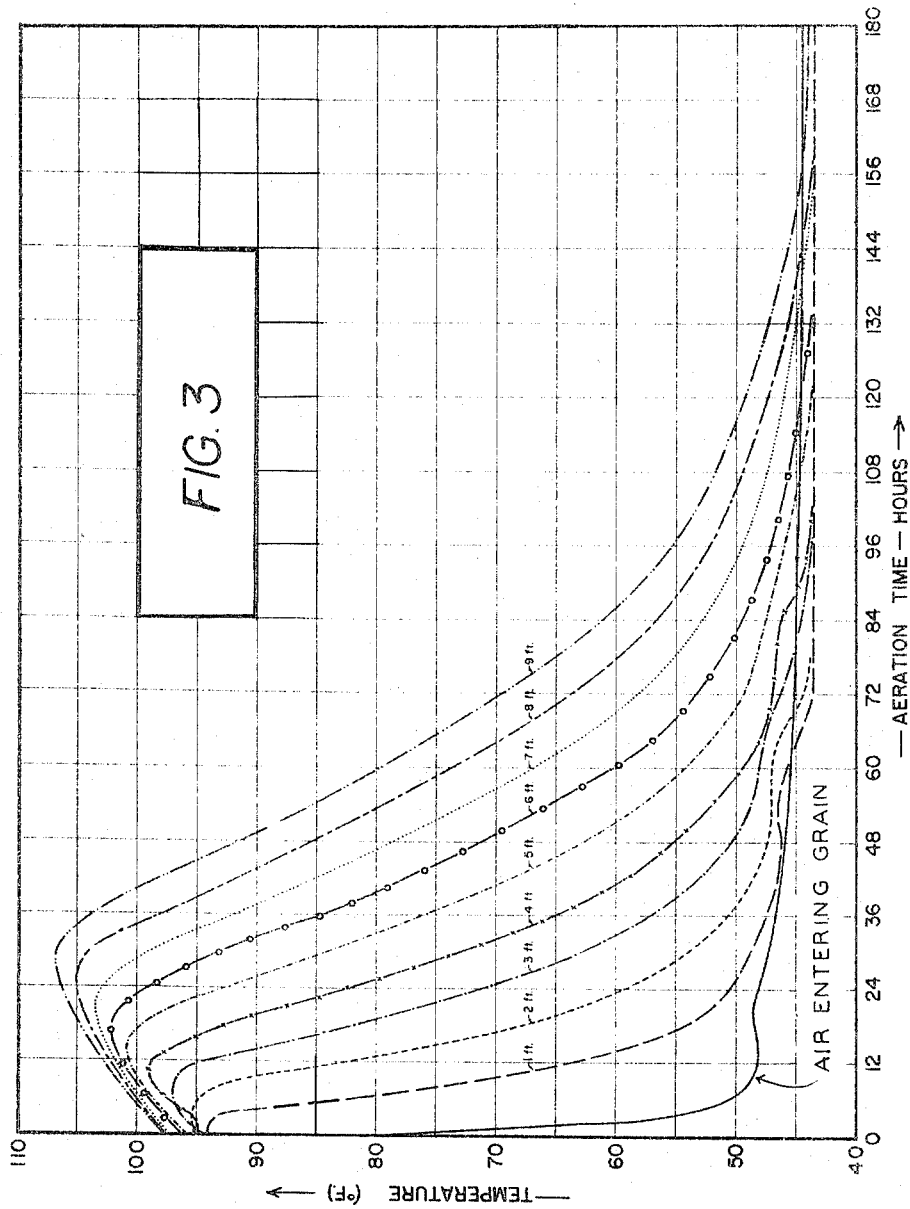
FIGURE 3 is a graph of the relationships of grain depth and aeration time to sensed grain temperature in the apparatus of FIGURE 1 during operation of the process of this invention.

The temperature-time relations were as shown in FIGURE 3. FIGURE 4 shows the overall relationship of the aeration time and moisture content of grain from the figures therefor tabulated in Table 3.

As shown in FIGURE 3, approximately five days (115 hours) were required to reduce temperature in all parts of the bin to 50° F. or lower. This is although the grain temperature at the beginning of the test averaged 95° F. and portions thereof had an initial period of temperature increase.

After the initial 150 hour cooling period, grain temperatures were maintained at 45° F. to 50° F. by temperature controls above described during the remainder of the 194-day storage period. The final (194-day) grain product had the same sedimentation qualities as that grain had prior to storage.

Sample platings on malt sugar agar (7.5 percent salt) indicated, as shown in Table 1, no significant change during the storage period in the prevalence of kernals containing viable fungi. Field fungi counts were relatively constant while storage count fungi increase in prevalence only at the seven to nine foot level and only during the period preceding the first sampling date. However, the increase was relatively small. The rate of metabolic activity of all fungi infesting the grain as indicated by the sample platings appear to have been reduced to a minimum consistent with that required for maintenance of viability but below the level required for a significant increase of kernel infestations by any specie or group of species.

Visual inspection of grain samples taken at all depths showed no indication of insect activity or damage.

Germination tests as shown in Table 2 indicated only slight change in germination during the storage period. Germination of the seed at the start of storage averaged 77.95 percent compared to 74.32 percent at the end of the test period.

The moisture content of the grain was reduced by the treatment above described from an average of 18.19% at the beginning of the test as shown in Table 3 to 15.75% during the 194 day storage period as shown in FIGURE 4. This represents a total moisture loss of 2.44%. It will be noted that 50% of this loss occurred in the first 35 days of the storage and 25% of this total loss occurred in the first two and a half days. It will be noted that this change provides for 4.7 gallons of water obtained at coil 26 from a hundred bushels of grain in two days with another 14 gallons obtained over the remaining period of 192 days or an average of less than ¾ of a pound of water per day per 100 bushels of grain. As above described, this treating air had an average temperature of 45° and an average relative humidity of 50% which would have put it, as per Table 4, in equilibrium with grain having a moisture of only around 13%. Accordingly, in the preferred embodiment of the process of this invention, if higher percentage moisture in the final product were desired the input air (20) temperature would have been adjusted to between 50° and 55° F. for such a lesser degree of moisture loss as desired in the second stage of treatment according to this invention.

Nevertheless, no change in grade occurred in the grain during storage and treatment according to the process above described. Samples of the grain stored were graded by a licensed grain inspector according to U.S. grain standards. The grain graded No. 1 yellow milo at both the beginning and the end of the storage periods.

It will be noted that the rate of water removal from the grain is not directly dependent upon the grain temperature according to the process of this invention. For example, although the sensed temperature at 7, 8, and 9 feet depths were warmest as shown in FIGURE 3 during the initial treatment of the grain, the moisture difference (shown in Table 3) obtained over 3 days at such depths was substantially the same for the more rapidly cooled levels at the one, two, and three foot depths. This is although the sensed temperature at the lower (1, 2, and 3 foot) levels was between 10° F. and 50° F. cooler than the upper (7, 8, 9 foot) levels during the first 72 hours of aeration. During this time the air entering the grain from the plenum chamber was usually at about 47° F. Over the last 180 days of the 194-day period, however, the cold air is warmed by the grain thereabove and consequently has a greater evaporative effect on the upper levels of grain. This is shown by the change in the moisture content of the grains at the one to four foot level from the 33rd to the 194th day as compared with the change in moisture content of the upper levels, i.e., from five to nine feet, over this corresponding period (FIGURE 5). At the fifth day of treatment, however, it will be noted that the entire mass of grain was below a temperature of 50° F. (FIGURE 3). It is, accordingly, within the scope of this invention that after said grain mass is below 50° F., that the treating air then have a higher relative humidity, as in Table 4, whereby temperature is maintained below 50° F. while substantially no further moisture is removed from the grain as at portions 38 and 39 of curve 90 of FIGURE 4.

The same procedure and results are obtainable by the treatment of clover, wheat and corn, the characteristics of which are given on the attached Table 5.

The second part of the treatment, as above described, is applicable to some variation depending on the amount of moisture desired in the final grain. For this purpose, once the micropyle zone of the grain has been brought down to such temperature as to so gel the colloid constituents thereof so as to render such zone substantially impervious to the passage of moisture therethrough, as above defined, other air temperatures may be used, i.e., after the first three or four days, other relative humidities of the air passing through the mass of grain may be used as shown in Table 4 to provide qualities of the finished grain as desired, i.e., if the final grain moisture is desired to be 15% (or 17%) and the initial water content is substantially higher, i.e., 18 percent (or 20%) as above described, the temperature of the air may be lowered, i.e., to 40° F., provided the relative humidity is kept sufficiently high, i.e., around 68% (or 78%) if the final grain quality is desired to be of such value (15% or 17%, respectively).

Figure 6:
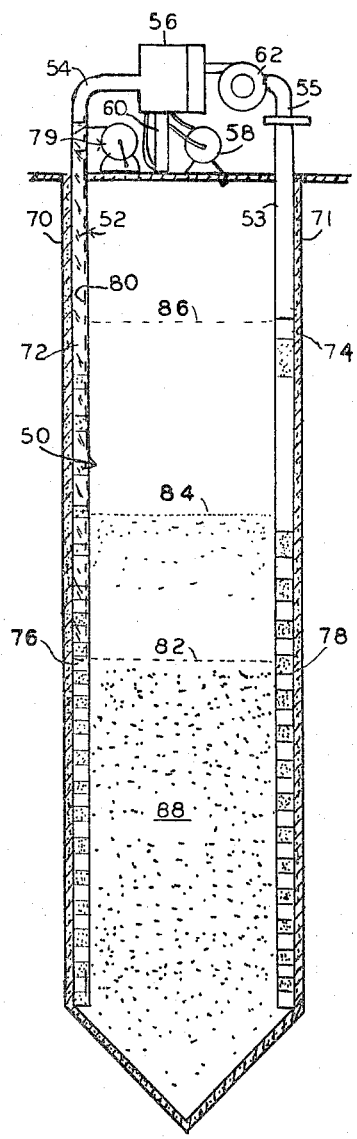
FIGURE 6 is a longitudinal diagrammatic sectional view of another apparatus for performing the process of this invention, said view being taken on the vertical plane shown as section 6A–6B of FIGURE 7.
Figure 7:
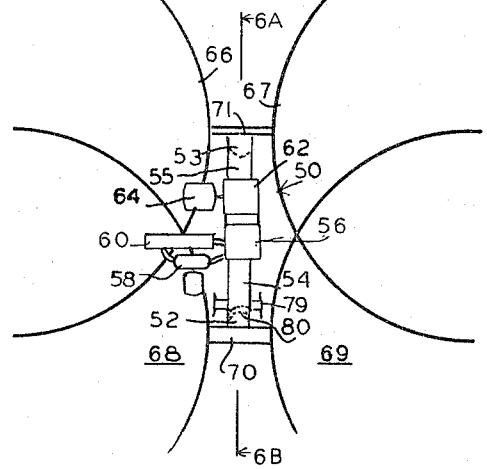
FIGURE 7 is a top view of the apparatus shown in FIGURE 6.
Figure 8:
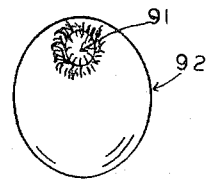
FIGURE 8 is a perspective view of a grain of milo sorghum.
Figure 9:
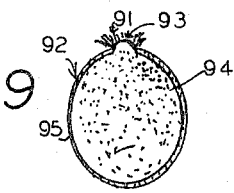
FIGURE 9 is a longitudinal cross-sectional diagram through the grain shown in FIGURE 8.

In another embodiment of apparatus for performing the process of this invention, shown in FIGURES 6 and 7, a cross-flow aeration system was installed in a 6400 bushel vertical interstice concrete storage bin, 50. Cross-flow aeration ducts 52 and 53 were connected by means of additional duct work 54, 55, to form a closed air circulation system with a 15 ton refrigeration evaporative coil, 56, comprising two 7½ ton coils, operatively connected with a five-ton compressor, 58, and a condenser coil, 60. Air movement through this closed aeration system was provided by an 18 inch tubeaxial fan, 62, powered by a direct connected five H.P. electric motor, 64.

The interstice bin (50) was located and defined by the adjacent walls of four 20-ft. diameter concrete circular bins 66, 67, 68 and 69 and end walls 70 and 71. Walls 70 and 71 were 14 feet apart and the distances between the closest and furthest portions of walls of bins 68 and 69 were 30 inches and 65 inches, respectively. The bin 50 was 120 feet high exclusive of a conical bottom formed with its walls at 45° to the horizontal. Static pressure readings were provided at points 72, 74 (20 ft. depth) and 76 and 78 (100 ft. depth) to determine and control the amount of air being moved through the grain. The ducts, 52 and 53, were each 12 inch diameter round 18 gauge steel duct half round in section. The pressure side or intake duct 52 was 18 inch diameter half round solid for the first or upper 20 feet; thereafter there was ten feet of 18 inch diameter half round perforated duct followed by 17 feet of perforated and solid 3 foot long duct sections alternating. The remainder of the 120 feet depth of duct was alternately three feet of solid and three feet of perforated duct. The exhaust side 53 is a 22 inch half round duct and was perforated for 3 feet at a depth of about 18 feet and is solid duct therebelow to a depth of 40 feet. There are therebelow lengths of 3 foot long perforated half round duct alternating with three foot lengths of solid half round duct for the remainder of 120 feet.

A four mil thick polyethylene plastic liner (80) was used in the intake aeration duct to allow aeration of the grain when the bin was only partially loaded, as shown by the grain levels (82, 84, 86), in dotted lines. As the bin is loaded, the duct liner is pulled upward of the duct 52 to expose more of the perforated section to provide an even flow of the air through the grain load, 88. The liner 80 may, in the preferred embodiment, be wound on a spool, as 79, for convenience in the raising and lowering and storing thereof. The spool is located on the same side of the duct 52 as the direction taken by the air passing from that duct into the mass of grain, as 88, in the bin.

In the operation with this apparatus there were added to the bottom of the dry bin, 50, a first load of 30,000 pounds of milo, moisture 11 percent, then 28,580 pounds of milo with 15 percent moisture; the next load was 9,880 pounds, moisture 16.45 percent for a total of 68,000 pounds at 13.2 percent moisture added in 24 hours. Here, as in the above-mentioned operation of FIGURE 1 apparatus, the compressor unit was fully loaded at the first days of the operation, but when the grain temperature later drops to around 50° F., the compressor is not fully loaded even though both evaporative coils were working. The temperature of the grain placed in the bin was initially around 85° F. An initial drop of 10° F. in grain temperature occurred during the first 24 hours of operation, but 31 days were required to reduce the temperature of the 6400 bushels from 85° to 50° F. During this period, outdoor air temperatures in excess of 95° F. occurred daily. The initial rate of water removal (at coil 56) for the first 24 hours was from three to four gallons per hour.

The liner or sleeve 80 within duct 52 will be held adjacent the inner surface of the inlet or intake duct 52 by the air pressure in that duct. The ducts 52 and 53 may be evenly perforated throughout their lengths rather than as above described to improve the distribution of air flow through the grain in the bin. The exhaust duct may also have a liner therein, which liner may be elastically pressed toward the interior surface of that perforated duct, especially if that liner be a C-shaped pneumatic tube which may be inflated where it is desired to be held in place and deflated when it is desired to be moved from one position to another up and/or down the length of the duct 53.

Table 1.—Mold counts from sorghum seed stored in test bin

| Depth of Grain, Feet | Aeration Time, Days | Kernels from Which Molds Were Isolated, Percent | Percent Kernels Infested With— | |
|---|---|---|---|---|
| | | | Field Molds | Storage Molds |
| 1 | Beginning of Test. | 100 | 100 | 0 |
| 2 | | 100 | 99 | 2 |
| 3 | | 99 | 99 | 0 |
| 4 | | 99 | 99 | 1 |
| 5 | | 100 | 100 | 1 |
| 6 | | 100 | 100 | 1 |
| 7 | | 100 | 100 | 1 |
| 8 | | 100 | 100 | 0 |
| 9 | | 97 | 97 | 1 |
| 1 | 12 | 100 | 100 | 0 |
| 2 | 12 | 100 | 100 | 0 |
| 3 | 12 | 100 | 100 | 0 |
| 4 | 12 | 98 | 98 | 0 |
| 5 | 12 | 99 | 99 | 0 |
| 6 | 12 | 100 | 100 | 0 |
| 7 | 12 | 99 | 98 | 5 |
| 8 | 12 | 100 | 98 | 3 |
| 9 | 12 | 100 | 98 | 4 |
| 1 | 47 | 100 | 100 | 0 |
| 2 | 47 | 100 | 100 | 0 |
| 3 | 47 | 100 | 100 | 0 |
| 4 | 47 | 100 | 100 | 3 |
| 5 | 47 | 100 | 100 | 0 |
| 6 | 47 | 100 | 100 | 0 |
| 7 | 47 | 100 | 100 | 0 |

Table 1—Continued

| Depth of Grain, Feet | Aeration Time, Days | Kernels from Which Molds Were Isolated, Percent | Percent Kernels Infested With— | |
|---|---|---|---|---|
| | | | Field Molds | Storage Molds |
| 8 | 47 | 100 | 100 | 3 |
| 9 | 47 | 100 | 98 | 7 |
| 1 | 85 | 100 | 100 | 0 |
| 2 | 85 | 100 | 100 | 0 |
| 3 | 85 | 100 | 100 | 0 |
| 4 | 85 | 100 | 99 | 1 |
| 5 | 85 | 100 | 100 | 0 |
| 6 | 85 | 100 | 100 | 0 |
| 7 | 85 | 100 | 100 | 0 |
| 8 | 85 | 100 | 100 | 2 |
| 9 | 85 | 100 | 100 | 4 |
| 1 | 114 | 100 | 100 | 1 |
| 2 | 114 | 100 | 100 | 0 |
| 3 | 114 | 100 | 100 | 0 |
| 4 | 114 | 100 | 100 | 1 |
| 5 | 114 | 100 | 100 | 0 |
| 6 | 114 | 100 | 100 | 0 |
| 7 | 114 | 100 | 100 | 1 |
| 8 | 114 | 100 | 99 | 3 |
| 9 | 114 | 100 | 100 | 7 |
| 1 | 194 | 100 | 100 | 1 |
| 2 | 194 | 100 | 100 | 1 |
| 3 | 194 | 100 | 100 | 0 |
| 4 | 194 | 100 | 100 | 1 |
| 5 | 194 | 100 | 100 | 2 |
| 6 | 194 | 100 | 100 | 0 |
| 7 | 194 | 100 | 100 | 4 |
| 8 | 194 | 100 | 100 | 0 |
| 9 | 194 | 100 | 100 | 0 |

Table 2.—Percent germination of stored grain as related to storage time

| Depth of grain, feet[1] | Storage Time, Days | | | | | |
|---|---|---|---|---|---|---|
| | Start of Test | 8 | 47 | 85 | 114 | 194 |
| 1 | 78.0 | 75.0 | 68.0 | 64.5 | 73.0 | 77.0 |
| 2 | 77.0 | 79.7 | 76.5 | 75.0 | 75.0 | 72.0 |
| 3 | 77.7 | 75.0 | 73.5 | 69.0 | 73.0 | 72.0 |
| 4 | 76.0 | 76.0 | 59.0 | 75.0 | 76.0 | 76.0 |
| 5 | 74.5 | 76.7 | 70.0 | 73.0 | 74.0 | 70.0 |
| 6 | 84.2 | 79.0 | 76.5 | 69.0 | 83.5 | 74.0 |
| 7 | 78.7 | 82.2 | 84.5 | 77.0 | 83.5 | 79.0 |
| 8 | 76.2 | 78.2 | 68.0 | 66.5 | 82.0 | 77.0 |
| 9 | 79.3 | 79.0 | 73.0 | 70.5 | 74.0 | 72.0 |
| Average | 77.95 | 77.84 | 72.11 | 71.05 | 77.11 | 74.32 |

[1] The samples for data of Tables 1, 2, 3, and FIGURES 3 and 5 given for depths of 1, 2, 3, 4, 5, 6, 7, 8 and 9 feet are taken at sample ports 41, 45, 42, 48, 43, 47, 44, 46 and 45, respectively, of the apparatus of FIGURE 1.

Table 4.—Generalized table of equilibrium of air relative humidities for grain at the same temperature

| Grain Moisture, Percent | Temperature, Degrees F. | | |
|---|---|---|---|
| | 40 | 60 | 77 |
| | Relative Humidity of Air | | |
| 17 | 78 | 83 | 85 |
| 16 | 73 | 79 | 81 |
| 15 | 68 | 74 | 77 |
| 14 | 61 | 68 | 71 |
| 13 | 54 | 61 | 65 |
| 12 | 47 | 53 | 58 |

Table 5.—Refrigerated grain storage process data

| Seed | Surface Area Individual Seed (sq. ft.) | Surface Area, Square Feet Per Bushel | Air Flow Rates, c.f.m. per Bushel | Air Flow Distribution, c.f.m. Per Square Foot Surface Area |
|---|---|---|---|---|
| Clover | $8.53 \times 10^{-5}$ | $7.26 \times 10^2$ | $5.0 \times 10^{-2}$ to $5.0 \times 10^{-1}$ | $6.89 \times 10^{-5}$ to $6.89 \times 10^{-4}$ |
| Milo | $3.40 \times 10^{-4}$ | $3.38 \times 10^2$ | $5.0 \times 10^{-2}$ to $5.0 \times 10^{-1}$ | $1.48 \times 10^{-4}$ to $1.48 \times 10^{-3}$ |
| Wheat | $4.44 \times 10^{-4}$ | $4.45 \times 10^2$ | $5.0 \times 10^{-2}$ to $5.0 \times 10^{-1}$ | $1.10 \times 10^{-4}$ to $1.10 \times 10^{-3}$ |
| Corn | $3.66 \times 10^{-3}$ | $2.53 \times 10^2$ | $5.0 \times 10^{-2}$ to $5.0 \times 10^{-1}$ | $1.98 \times 10^{-4}$ to $1.98 \times 10^{-3}$ |

The use of air only in the first as well as second stages of treatment according to the process of this invention achieves the above-described objects without using any gases toxic to humans in the grain treatment and so avoids any undesirable residues in the grain.

This process is also particularly applicable to the storage and treatment of grains during conditions of noxious air, e.g. smog, dust, poison gas and radioactive fall-out situations outside the bin or container as 10 or 50 containing said grain. The closed air system provided by the process and apparatus of this invention permits the storage of grain without use of air or gas from sources external to the bin and ducts connected thereto and thereby avoids undesirable absorption by said grain of noxious constituents carried by such gases.

Although, in accordance with the provisions of the patent statues, particular preferred embodiments of this invention have been described in detail and the principles of the invention have been described in the best mode in which it is now contemplated applying such principles, Table 3.—Relationship of aeration time and moisture content of grain

| Aeration Time, Days | Moisture Content, Percent | | | | | | | | | |
|---|---|---|---|---|---|---|---|---|---|---|
| | Grain Depth, Feet | | | | | | | | | Average |
| | 1 | 2 | 3 | 4 | 5 | 6 | 7 | 8 | 9 | |
| Beginning of Test | 17.45 | 17.65 | 17.75 | 18.50 | 18.30 | 18.15 | 18.30 | 18.70 | 18.90 | 18.19 |
| 3 | 16.92 | 17.14 | 17.29 | 18.00 | 17.75 | 17.45 | 17.75 | 17.85 | 18.30 | 17.61 |
| 5 | 17.20 | 17.16 | 17.42 | 18.05 | 17.63 | 17.24 | 17.14 | 17.75 | 17.75 | 17.48 |
| 8 | 17.07 | 17.18 | 17.37 | 17.90 | 17.51 | 17.07 | 17.22 | 17.30 | 17.57 | 17.35 |
| 12 | 17.10 | 17.15 | 17.32 | 17.65 | 17.51 | 17.16 | 17.40 | 17.35 | 17.42 | 17.34 |
| 19 | 16.96 | 17.14 | 17.37 | 17.60 | 17.41 | 17.10 | 17.20 | 17.19 | 17.33 | 17.26 |
| 33 | 16.55 | 16.99 | 17.13 | 17.61 | 17.10 | 17.09 | 17.08 | 16.95 | 17.03 | 17.06 |
| 47 | 16.00 | 16.51 | 16.90 | 17.19 | 16.78 | 16.65 | 16.75 | 16.64 | 16.75 | 16.68 |
| 69 | 15.71 | 16.05 | 16.60 | 17.01 | 16.62 | 16.91 | 16.84 | 16.45 | 16.60 | 16.53 |
| 85 | 15.52 | 15.75 | 16.42 | 16.70 | 16.82 | 16.82 | 16.54 | 16.54 | 16.15 | 16.36 |
| 114 | 15.22 | 15.45 | 16.15 | 16.51 | 16.00 | 16.74 | 16.51 | 16.51 | 15.82 | 16.10 |
| 148 | 15.55 | 15.09 | 15.32 | 15.65 | 15.88 | 16.52 | 16.11 | 16.26 | 15.32 | 15.74 |
| 194 | 15.64 | 15.45 | 15.99 | 15.66 | 15.78 | 15.79 | 15.73 | 16.17 | 15.50 | 15.75 |

We claim:

1. A process of storing in a bin a mass of grain, said mass comprising grain and interseed spaces between said grain, and said grain having an initial temperature of between 85° F. and 107° F. and a water content between 14% and 20% by weight and having a seed coat and an endosperm therein, said seed coat having a micropyle and being relatively impervious to moisture, said seed coat having a substantial oil content and said endosperm having a smaller oil content, said process comprising a first step of gelling the constituents of the micropyle zone to a substantially water-impervious mass by rapidly cooling and removing water from said grain in from one to three days by passing into said mass air having a temperature of between 30° F. and 70° F. and, respectively, relative humidities of between 100 and 60 percent and so removing water from said grain at an initial rate of from three to five gallons per hour per 1,000 bushels of said grain during the first ten hours of said process, said air being passed thereinto at the rate of from 0.5 to 0.05 cubic feet per minute per bushel, while reducing the average temperature of all the grain to below 55° F. in 72 hours, thereafter maintaining the temperature of the grain below 50° F. for at least 100 days while removing less than 0.75% moisture therefrom per 90 days of storage.

2. A process as in claim 1 including the step of impregnating the grain with a vapor prior to gelling the constituents of the micropyle zone.

3. A process of storing in a bin a mass of grain, said mass comprising grain and interseed spaces between said grain, said grain having an initial temperature of between 85° F. and 107° F. and a water content of 14% to 20% by weight and having a seed coat and an endosperm therein, said seed coat having a micropyle and being relatively impervious to moisture, said seed coat having an oil content of approximately 5% and said endosperm having an oil content less than 1% and said process comprising a first step of gelling the constituents of the micropyle zone to a substantially water-impervious mass by rapidly cooling and removing water from said zone in from one to three days by passing into said mass air having a temperature between 30° F. and 70° F. and, respectively, relative humidities of between 100 percent and 60 percent and forming exhaust gas of temperatures between 40° F. and 100° F. with between 95% and 75% relative humidity, respectively, so removing water from said grain at an initial rate of from three to five gallons per hour per 1,000 bushels in the first ten hours, said air being passed thereinto at the rate from 0.5 to 0.05 cubic feet per minute per bushel, reducing the temperature of all the said grain to below 50° F. in 120 hours, thereafter maintaining the temperature of the grain below 50° F. for at least 100 days while removing less than 0.75% moisture therefrom per 90 days of storage of said at least 100 days by passing therepast in said interseed spaces air having a moisture content in equilibrium with the moisture content of said grain at the temperature of said grain.

4. A process as in claim 3 including the step of impregnating the grain with water and raising the water content of said grain prior to gelling the constituents of the micropyle zone.

5. A process of storing grain as in claim 1, said grain being selected from the group consisting of wheat, grain sorghum, barley, and corn.

6. A process of storing a mass of grain with an initial temperature between 85° F. and 107° F. and a moisture content between 14% and 20% for a period of at least 100 days, said grain having a surface area of from 200 to 800 square feet per bushel, comprising circulating air through said mass of grain in a closed container, said air having a temperature between 33° and 70° F., and respectively, a relative humidity of between 100% and 60% at the rate of $7 \times 10^{-5}$ to $20 \times 10^{-5}$ cubic feet per minute per square foot of surface area of said grain, and so removing water from said grain, cooling and dehumidifying the gas exiting from said grain, and so maintaining less than 70% humidity in the interseed air, and bringing the temperature of all the grain in said mass to below 50° F. in an initial period of 12 to 180 hours and thereafter maintaining grain temperature at every point in said mass below 50° F. for the remainder of said period of at least 100 days.

7. A process as in claim 6 where the input air has a temperature ranging from 33° F. to 70° F. and a respective relative humidity of 100% to 60% and the output air temperature range is 40° to 100° F. and respectively, 75% to 95% relative humidity.

References Cited by the Examiner

UNITED STATES PATENTS

| | | | |
|---|---|---|---|
| 2,027,268 | 1/1936 | Davis | 34—232 |
| 2,032,264 | 2/1936 | Davis | 99—153 |
| 2,036,127 | 3/1936 | Edholm | 98—55 |
| 2,566,327 | 9/1951 | Hallock | 34—232 |
| 2,655,734 | 10/1953 | Ohlheiser | 34—174 |
| 2,725,300 | 11/1955 | Cryns | 99—80 |
| 2,782,705 | 2/1957 | Breidert | 98—55 |
| 2,864,702 | 12/1958 | Murray et al. | 99—80 |
| 3,044,182 | 7/1962 | Steffen | 34—50 |
| 3,090,130 | 5/1963 | Smith | 34—50 |

OTHER REFERENCES

Encyclopedia of Chemical Technology (1949), vol. 3, p. 595, pub. by Interscience Encyclopedia, Inc., 215 Fourth Ave., N.Y.C.

A. LOUIS MONACELL, *Primary Examiner.*

NORMAN YUDKOFF, *Examiner.*

F. E. DRUMMOND, R. N. JONES,
*Assistant Examiners.*